United States Patent
Crowell

(10) Patent No.: US 8,214,115 B2
(45) Date of Patent: Jul. 3, 2012

(54) SYSTEM AND METHOD OF CHANGING ENGINE PERFORMANCE CURVES TO MANAGE HEAT GENERATION

(75) Inventor: Thomas J. Crowell, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 638 days.

(21) Appl. No.: 12/337,421

(22) Filed: Dec. 17, 2008

(65) Prior Publication Data

US 2010/0152983 A1 Jun. 17, 2010

(51) Int. Cl.
*G06F 7/00* (2006.01)
(52) U.S. Cl. .......................................... 701/54; 701/101
(58) Field of Classification Search .................. 701/54, 701/101
See application file for complete search history.

(56) References Cited

U.S. PATENT DOCUMENTS

| | | | |
|---|---|---|---|
| 4,102,131 A | 7/1978 | Reynolds et al. | |
| 4,232,572 A | 11/1980 | Ross et al. | |
| 4,306,449 A | 12/1981 | Hoffman | |
| 4,648,040 A | 3/1987 | Cornell et al. | |
| 4,663,713 A | 5/1987 | Cornell et al. | |
| 4,663,714 A | 5/1987 | Cornell et al. | |
| 5,257,193 A * | 10/1993 | Kusaka et al. | 701/110 |
| 5,468,126 A | 11/1995 | Lukich | |
| 5,868,214 A | 2/1999 | Workman | |
| 5,947,087 A * | 9/1999 | Minowa et al. | 123/399 |
| 6,248,041 B1 * | 6/2001 | Den Besten | 477/110 |
| 6,339,737 B1 * | 1/2002 | Yoshimura et al. | 701/50 |
| 6,387,011 B1 * | 5/2002 | Bellinger | 477/111 |
| 6,839,619 B2 | 1/2005 | Bellinger | |
| 6,842,689 B2 * | 1/2005 | Andres et al. | 701/110 |
| 7,000,590 B2 | 2/2006 | Carlton et al. | |
| 7,246,001 B2 | 7/2007 | Anderson et al. | |
| 7,340,339 B1 | 3/2008 | Fabry et al. | |
| 7,347,168 B2 | 3/2008 | Reckels et al. | |
| 7,664,586 B2 * | 2/2010 | Ozawa et al. | 701/50 |
| 7,774,117 B2 * | 8/2010 | Ozawa et al. | 701/54 |
| 2003/0079720 A1 * | 5/2003 | Mccauley et al. | 123/350 |
| 2003/0216847 A1 * | 11/2003 | Bellinger | 701/51 |
| 2005/0177293 A1 | 8/2005 | Ammann et al. | |
| 2006/0161324 A1 * | 7/2006 | Ozawa et al. | 701/50 |

\* cited by examiner

*Primary Examiner* — Mary Cheung
*Assistant Examiner* — Truc M Do
(74) *Attorney, Agent, or Firm* — Leydig, Voit & Mayer

(57) ABSTRACT

A system and method for managing the heat produced by operation of an internal combustion system utilizes an electronic controller to control operation the engine that is coupled to a transmission. The transmission can include a high drive ratio and a low drive ratio. Stored in the controller are a plurality of different performance curves. When the transmission is in the low drive ratio, the controller selects a performance curve that comparatively increases the amount of torque and/or power the engine produces. When the transmission is in the high drive ratio, the controller selects a performance curve that comparatively reduces torque and/or power produced by the engine. Because the engine generates less heat when it produces less torque, the engine can accommodate additional emissions control devices and/or techniques that may otherwise adversely affect heat rejection.

16 Claims, 3 Drawing Sheets

SYSTEM AND METHOD OF CHANGING ENGINE PERFORMANCE CURVES TO MANAGE HEAT GENERATION

TECHNICAL FIELD

This patent disclosure relates generally to emissions controls for internal combustion engines and, more particularly to methods and systems for adapting an internal combustion engine to accommodate emission control devices and techniques.

BACKGROUND

Internal combustion engines are used in a wide variety of applications to perform work such as moving a load. One common example is "over the road" or "on highway" vehicles, in which engines are used to drive or propel the vehicle. In these applications, engines carry out an internal combustion process in which the engine burns fuel to covert the potential or chemical energy therein to mechanical energy in the form of rotational torque. When employed on "over the road" vehicles, a drive train utilizes the rotational torque to propel the vehicle, for example, by using the torque to rotate a drive shaft that in turn drives the wheels or tracks of the vehicle. Torque, which is also related to power, is an important indicator of engine performance and further affects and influences many aspects of the internal combustion process.

U.S. Pat. No. 6,248,041 to Den Besten describes in part the relationship between torque and engine speed, and generally describes how a vehicle may be equipped with a computer or electronic controller for adjusting that relationship. The patent in particular describes systems and methods that adjust the torque and engine speed relationship as the vehicle shifts through various drive ratios for the purpose of imparting to the driver of the vehicle a feeling or sensation that the vehicle's power is in accordance with the drive ratio.

One well-known problem with internal combustion engines is that the combustion process can produce pollution byproducts and other emissions in the form of exhaust gases. To counter this problem, manufactures often employ a wide range of emissions control techniques and devices. Some common emissions control devices include mufflers, filters, catalytic convertors and the like that are added to the exhaust system and through which the exhaust gases must flow. Another technique to reduce engine emissions is exhaust gas recirculation ("EGR") in which a portion of the exhaust gases are re-circulated back to the intake. The presence of the exhaust gases during the combustion process reduces the amount of nitrogen oxides produced by the combustion of fuel. As pollution and the environment becomes an increasing concern, government regulators are requesting that manufactures meet increasingly stringent emissions requirements, which manufactures may accomplish by the inclusion of additional emissions control devices or techniques on the engines or vehicles. A drawback of these types of emissions control devices and techniques are that they may negatively affect heat rejection from the engine. Internal combustion engines generate heat that must be removed to maintain proper operating temperature of the engine and prevent overheating and engine damage. Heat is typically carried away or removed via the engine exhaust, via water-side heat rejection (engine coolant), via air-side heat rejection (ATAAC), and via convection radiation. A large portion of the removed heat is carried away from the engine via the exhaust system. However, the added emission controls may insulate the engine and resist heat dissipation. Further, in order to ensure proper operating temperatures, the EGR process will necessitate increased heat rejection.

To supplement heat removal, many engine systems further include cooling systems that may circulate coolant through the engine. Such cooling systems are often designed or sized to provide sufficient cooling at a rated engine speed and at a rated load. Moreover, for aesthetic and aerodynamic reasons, manufactures often wish to minimize the size and prominence of the cooling system. However, as additional emissions controls are included, the increased heat load may overwhelm the cooling system. Accordingly, there is a need for an improved way to manage the heat produced by the engine while accommodating emissions control devices that may otherwise negatively affect heat rejection.

SUMMARY

The disclosure describes, in one aspect, a method of managing heat produced by an internal combustion system including an internal combustion engine coupled to a transmission having at least a low drive ratio and a high drive ratio. The method monitors the engaged drive ratio of the transmission during operation of the internal combustion engine. The method further involves storing in a computer or electronic controller a plurality of different performance curves including at least a first performance curve and a second performance curve that are selectable by the controller to operate the engine. The controller selects a performance curve based in part on the engaged drive ratio of the transmission and operates the engine in accordance with the selected performance curve. The controller selects the first performance curve when the transmission is engaged in a low drive ratio with the first performance curve configured to increase torque output. The controller selects the second performance curve when the transmission is engaged in a high drive ratio with the second performance curve configured to reduce torque output.

The disclosure describes, in another aspect, a system for managing heat produced by an internal combustion engine. The system includes an internal combustion engine and a transmission coupled to the internal combustion engine having a plurality of different engageable drive ratios. A computerized or electronic controller is in communication with the transmission to monitor the engaged drive ratio. The controller stores a plurality of different performance curves including a first performance curve corresponding to increased torque output and a second performance curve corresponding to reduced torque output. The system also includes a cooling system rated for cooling the internal combustion engine during operation under the second performance curve. The controller selects a performance curve based in part upon the engaged drive ratio monitored in the transmission.

In another aspect, the disclosure describes a method of enabling a vehicle to accommodate emissions controls. A vehicle is provided that includes an internal combustion engine coupled to a transmission having a high drive ratio and a low drive ratio. The method involves installing on a vehicle an emissions control that adversely affects heat rejection from the internal combustion engine. The method further involves storing in a controller a plurality of different performance curves selectable by the controller to operate the vehicle. The controller monitors the transmission to determine the engage drive ratio and selects a performance curve based in part upon the monitored drive ratio. The performance curve selected for the low drive ratio increases torque compared to the performance curved selected for the high drive ratio.

DETAILED DESCRIPTION

This disclosure generally relates to a system or method for managing heat generated by internal combustion engines, such as those used on "over the road" or "on highway" vehicles and other types of machines, in order to accommodate emissions control devices installed on the vehicle or machine or techniques used by the vehicle to reduce production of nitrogen oxides. "Over the road" and "on highway" vehicles, as the name implies, may include those that spend significant amounts of time transporting goods over highways and paved roads. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

Figure 1:
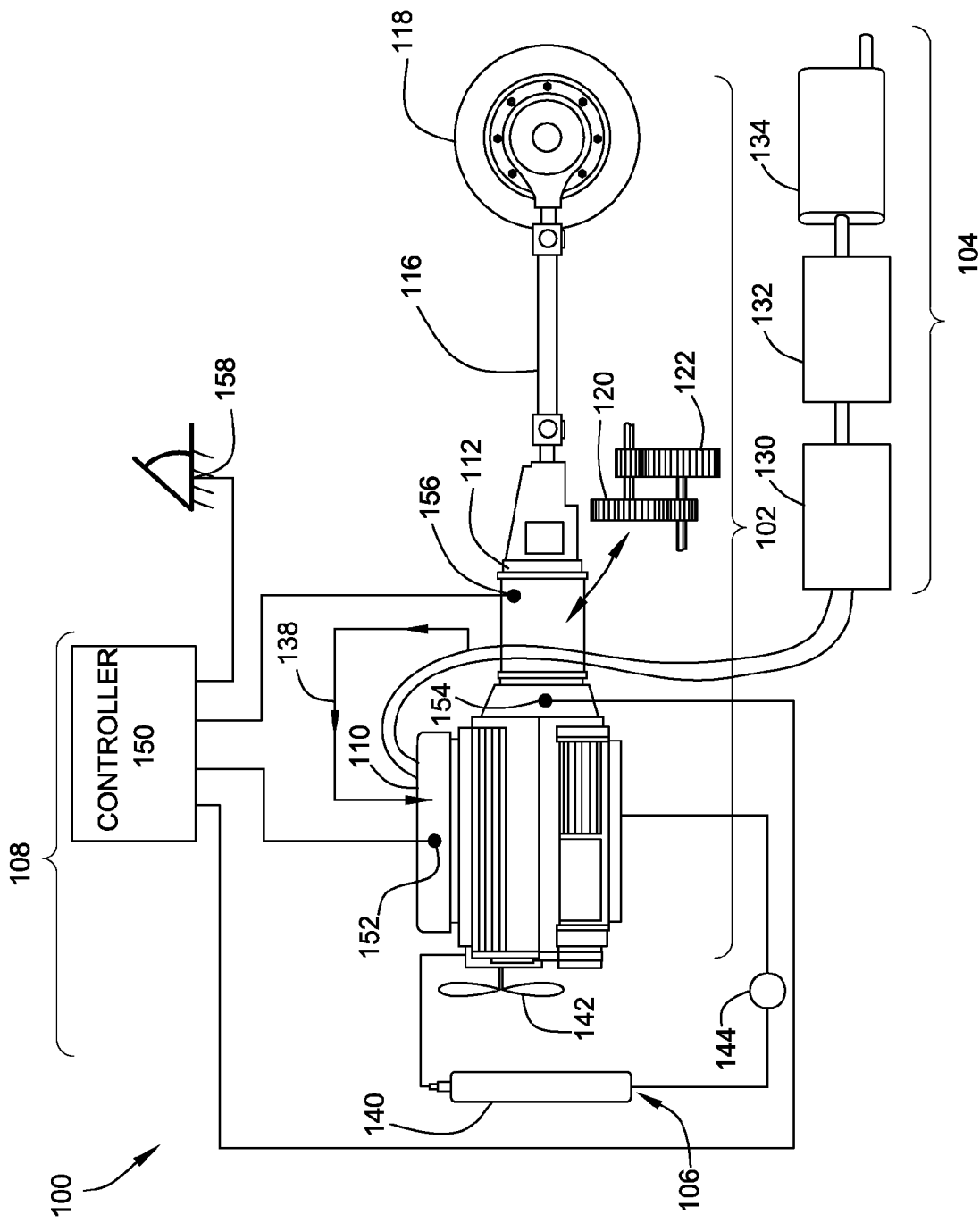
FIG. 1 is a schematic diagram representing an internal combustion system including a drive train having an internal combustion engine coupled to a transmission for, by way of example, rotating a wheel.

As illustrated in FIG. 1, an internal combustion system 100 designed in accordance with the disclosure may include a power train or drive train 102 for providing power, an exhaust system 104 for removing exhaust from the internal combustion engine, a cooling system 106 for cooling the temperature of the engine, and an electronic control system 108 which monitors and controls the components and operation of the system. Referring more particularly to the illustrated drive train 102, it includes an internal combustion engine 110 that is coupled to a transmission 112. The internal combustion engine 110 may be a multi-cylinder diesel engine that carries out an internal combustion process in which the potential chemical energy locked into diesel fuels is converted by combustion into mechanical energy in the form of rotational torque. However, it should be recognized that in other embodiments, the engine 110 may be configured to burn other types of hydrocarbon fuel or any various alternative fuels useable in the internal combustion process. The torque produced by the internal combustion process may rotate a crankshaft of the engine at a determined speed, referred to as engine speed, which is typically measured in revolutions per minute, or RPM.

In order to change or adjust the vehicle speed, the transmission 112 which is coupled to the engine 110 may include selectively engageable gears that allow selective switching between various gear or drive ratios. The different drive ratios cause the vehicle drive speed to increase or decrease for a given engine speed. In other embodiments, the transmission may be a continuously variable transmission that may have a wide range of selectable drive ratios. The output of the transmission 112 in turn can be operatively connected through a drive shaft 116 and an axle to a wheel 118 that contacts a surface. The transmission 112 and drive shaft 116 also serve to transfer torque or power produced by the engine 110 to the wheel 118 in order to propel the vehicle. The transmission 112 can be configured to operate in any number of speeds, which are determined by the selected gear or drive ratio, and which should include at least a low drive ratio, schematically represented by reference number 120, and a high drive ratio represented by reference number 122. As will be appreciated by those versed in the art, a low drive ratio 120 corresponds to a low rotational speed of the drive wheel 118 while a high drive ratio 122 corresponds to a high rotational speed of the drive wheel (or tracks in case of a earth moving machine).

To remove and process exhaust gases that are the byproducts of the internal combustion process, the exhaust system 104 is coupled to the exhaust manifold of the engine 110 by suitably arranged piping or the like. The exhaust system 104 may include various components for processing or manipulating the exhaust gases. Some of these components may be emissions control devices that are designed to reduce or remove pollution-causing byproducts of combustion and other environmentally harmful engine emissions from the exhaust flow. An example of such an emissions control device is a diesel particulate filter 130 that traps and oxidizes various particulates from the exhaust. Another control is a catalytic converter 132 that facilitates the chemical conversion of harmful gases into more environmentally benign gases that the exhaust system 104 can safely release. To reduce noise pollution formed by the sound of the engine 110, the exhaust system 104 can also include a muffler 134. Various other emissions controls can be included into the exhaust system, either at the time of assembly or later during a retrofitting operation. The exhaust system may also be equipped with an exhaust gas recirculation system 138 which, as is known to those of skill in the art, diverts and re-circulates a portion of the exhaust gases back to the intake of the engine 110. Exhaust gas recirculation is an emissions control technique that helps reduce the amount of nitrogen oxides produced during the combustion process.

Because the combustion process produces heat that raises the temperature of the engine and its associated components, the internal combustion system 100 may also include a cooling system 106 to help remove or dissipate the heat. The cooling system 106 may include a radiator 140 coupled to the engine 110 by hoses. The radiator 140 itself may be made of hollow tubes and fins through which a coolant can flow. To draw air over the radiator 140 and remove heat from the coolant flowing therein, a fan 142 may be coupled to the front of the engine 110 and directed toward the radiator. The rotational torque produced by the engine 110 turns the fan causing air flow across the radiator. To forcibly circulate coolant fluids through the radiator 140 and the engine 110, the cooling system 106 may further include a pump 144.

To supplement or, in some instances, replace the radiator, the cooling system 106 may also rely on radiation or convection of the generated heat to the surrounding ambient air. In fact, the engine 110 may include structures such as fins to assist in heat dissipation. In the embodiments where the system is part of a "on the road" vehicle, the velocity of the moving vehicle will cause ambient air to flow over and through the engine and its related components thereby cooling the system.

To control the operation and performance of the internal combustion engine and the related components, an electronic or computerized control system 108 is also included with the overall system. The control system includes a controller 150 such as an electronic control module that communicates with the internal combustion engine 110 and the various other components in the internal combustion system 100. The controller is adapted to receive various operating parameters and to responsively regulate various variables affecting engine operation. In the present embodiment, communication occurs by sending and receiving electronic signals between the controller 150 and various sensors and controls on the system components. One of these sensors and controls may be a fuel governor sensor and control 152 that monitors and adjusts the amount of fuel supplied to the engine. Another may be an engine speed sensor 154 that monitors the rotational speed of the crankshaft and that may be in the form of a magnetic or optical pickup sensor. Coupled to the transmission 112 may be a gear or drive ratio control 156 that monitors and shifts the transmission gears or drives. An operator input sensor 158 may also be included that monitors the input from the operator of the system, such as whether the operator is attempting to speed up or power up the vehicle by depressing the fuel pedal. Other parameters that the controller 150 may monitor include air intake, ambient and engine temperature, coolant temperature and flow rate, and exhaust and emissions output.

To enable it to carry out its functions of monitoring and adjusting operation and performance, the controller 150 may include a microprocessor or other appropriate circuitry. While the controller 150 illustrated in FIG. 1 is represented as a single unit, it should be appreciated that in other embodiments the control of the system may be distributed among a plurality of distinct, dedicated units. The controller 150 may also be adapted to store in memory various maps, tables and algorithms that utilize and process the parameters and variables affecting the performance of the system. These maps, tables and algorithms may be predetermined by empirical experimentation with similar engines or may be derived from theoretical prediction or a part of mathematical models.

Figure 2:
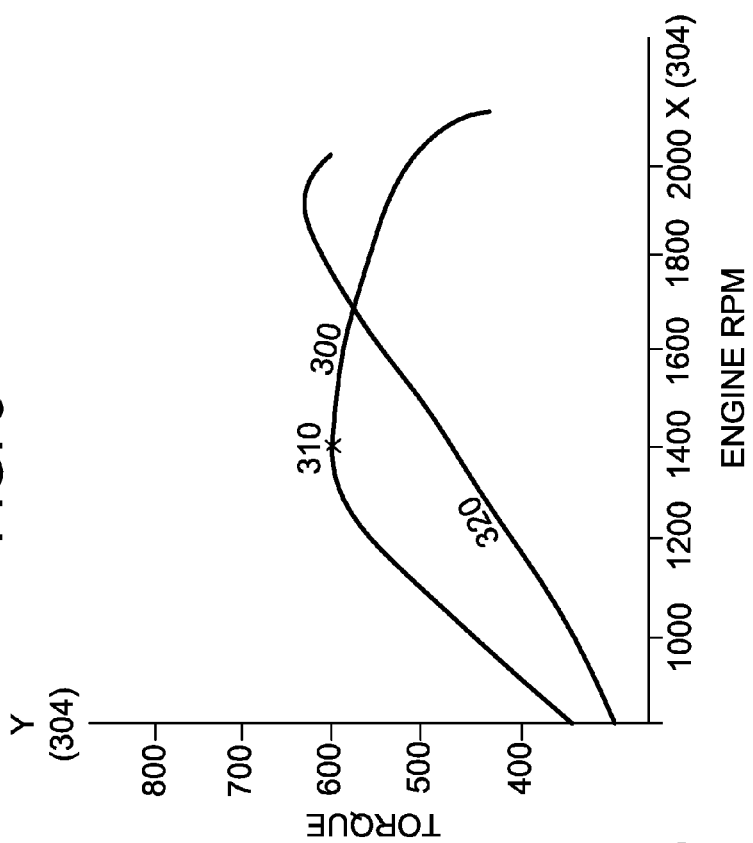
FIG. 2 is a graph illustrating an engine performance curve configured to produce a relatively increased amount of torque and power.

Among this stored information may be various performance curves such as torque curves, power curves, fuel efficiency curves and the like. Referring to FIG. 2, there is illustrated a torque curve 200 as a particular example of a performance curve. Torques curves, as are well known in the art, plot along a y-axis torque 202 as measured against engine speed 204 represented along the x-axis. Torque is the measure of rotational force as measured at a given distance from the axis of rotation and can be expressed in units such as foot pounds or "ft.-lb" and Newton-meters or "N-m." Torque curves, which are the function of many parameters including the physical dimensions of the engine, the quantity and quality of fuel supplied, and the load placed on the engine, can vary widely even for the same engine. Generally, however, many torque curves will illustrate low torque at low engine speeds such as idle, a rising slope 210 as torque increases and the engine speeds up, a peak torque value 212 representing the maximum torque the engine can produce under the conditions, and then a declining torque curve at high engine speed slope 214 representing that a further increase in speed requires a corresponding reduction in work that the engine needs to deliver for a given power. When a torque curve 200 such as that illustrated in FIG. 2 represents the full or total quantity of torque that an engine can produce at a given engine speed and under a given set of conditions, those of skill in the art sometimes refer to the curve as a lug curve. The engine can operate within the area under the lug or full torque curve 200.

Two parameters or conditions largely affecting the torque map are engine load and fuel quantity. Referring to FIG. 2, the amount of torque 202 that an engine must produce at a given speed is directly related to the load demand placed on the engine. Thus, the maximum load that the engine can handle at a given speed is represented by the lug or full torque curve 200. The quantity of fuel injected into the engine affects both the amount of torque that the engine can produce and the engine speed 204. If the engine is operating within the area under the full torque curve 200 with the load, and thus the required torque 202, remaining consistent, increasing the fuel quantity injected to the engine will cause the engine speed 204 to increase. Conversely, if the engine is operating within the area under the full torque curve 200 and the engine speed 204 remains consistent, increasing the fuel quantity injected to the engine will cause the quantity of torque 202 produced by the engine to increase.

Another measure of the performance of an internal combustion engine that is related to torque and is represented by line 220 on the chart shown in FIG. 2 is power. Power is typically measured in horsepower ("HP") or kilowatts ("kW"). Power is calculated by dividing torque by the time or duration over which the torque is applied, such as given by the equation Horse Power=(torque*engine speed)/5252. Because power is directly related to both torque and engine speed, the power curve 220 in FIG. 2 does not precisely follow the full torque curve 200 but continues to increase as engine speed 204 increases. The full power curve 220 may even continue to increase as the engine speed 204 increases beyond the peak torque value 212.

It is often desirable to vary the engine performance to achieve results or accommodate conditions that do not require operation at full torque or rated engine speed. For example, fuel efficiency is often a desirable result that may be achieved by operation at conditions other than those represented by the full torque curve 200 or full power curve 220. Accordingly, the controller may be provided with a plurality of different performance curves and maps. Depending upon the prevailing parameters or desired results, the controller may select the appropriate performance curves from the plurality and utilize the selected performance curve to control operation of the engine and associated components of the system.

Figure 3:
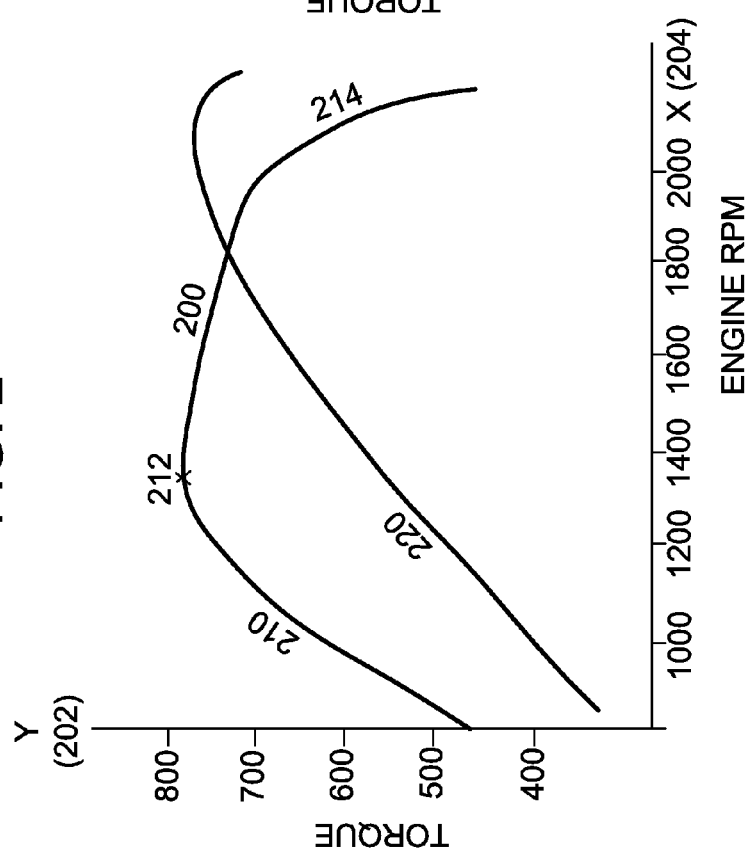
FIG. 3 is another graph illustrating an engine performance curve configured to produce a relatively reduced or limited amount of torque and power.

Referring to FIG. 3, there are illustrated possible modified performance curves, in particular a modified torque curve 300 and a modified power curve 320. As with FIG. 2, the modified torque curve 300 is mapped on a graph representing torque 302 along the y-axis and engine speed 304 along the x-axis. The modified torque curve 300 may be configured to reduce or limit the amount of torque the engine can produce and thus the amount of power that is available. For example, in the modified torque curve 300 the peak torque value 310 occurs at about 600 ft-lbs while, in comparison, in the full torque curve 200 in FIG. 2 the peak torque value 212 occurs at about 750 ft-lbs. Additionally, the modified power curve 320 in FIG. 3 will also be reduced in comparison to the full power curve 220 in FIG. 2.

When operating along the modified torque curve 300, the controller will manipulate operating variables and controls so that the quantity of torque produced by the engine is accordingly limited. As one example, to ensure that the torque is limited across a range of engine speed, the controller can provide threshold limits on the quantity of fuel the fuel governor can inject into the engine. Because the quantity of fuel provided to the engine is proportional to the quantity of torque produced, limiting the fuel quantity will also limit torque production and thus the power of the engine.

Figure 4:
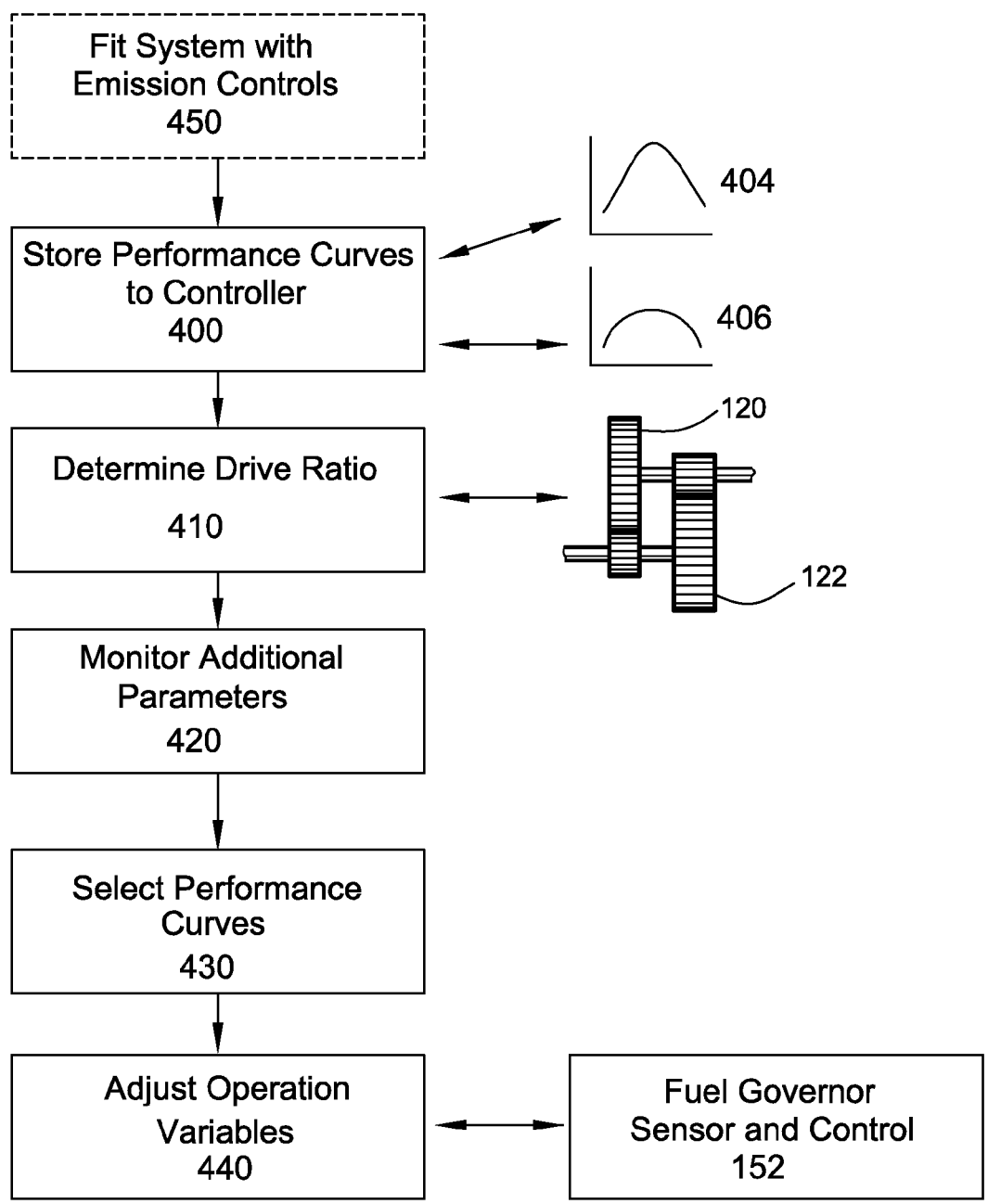
FIG. 4 is a flow chart illustrating the possible operation of an internal combustion system of FIG. 1 with a controller storing a plurality of engine performance curves.

Referring now to FIG. 4, there is illustrated a flowchart detailing one method according to which the aforementioned system may operate. In a first step 400, a plurality of performance curves and controls maps are loaded or stored into a controller of the system. Among the plurality of performance curves may be a first performance curve 404 that corresponds to a relatively high or increased amount of torque. The first performance curve 404 might even correspond to the full torque curve described in FIG. 2 for a particular engine. A second performance curve 406 may also be loaded or stored into the controller that may correspond to a reduced or limited amount of torque such as the modified torque curve described with respect to FIG. 3.

In a subsequent determining step 410, the controller queries or monitors the transmission to determine what drive ratio the transmission has currently engaged. Alternatively, the controller may attempt to determine the drive ratio by comparing engine speed to vehicle speed. As described above, the transmission may include at least a low drive ratio 120 and a high drive ratio 122. Subsequent to or simultaneously with the determining step 410, the controller in a monitoring step 420 may be monitoring any number of other system parameters such as fuel quantity, engine speed, pressure and timing, and exhaust and coolant system conditions. Based on the determined drive ratio and possibly the other monitored conditions, the controller in a selection step 430 will select an appropriate performance curve from the plurality of stored curves.

In the event the transmission is in the low drive ratio 120, possibly indicating that the engine is attempting to increase torque or speed or hauling a large load but for a short duration of time, the controller will select the first performance curve 404. The first performance curve corresponds to the increased or full quantity of torque and corresponding power the engine can produce. If, however, the transmission is in the high drive ratio 122, which may indicate that the vehicle is up to speed or no longer carrying an excessive load, the controller may select the second performance curve 406 corresponding to the limited or reduced quantity of torque and thus power. After the selection step 430, the controller will operate the engine and other components of the system according to the selected performance curve and, if necessary, will adjust in an adjustment step 440 the variables and controls accordingly. Thus, when installed on a vehicle, the particular performance curve that is selected will govern how the controller operates the vehicle. For example, when operating according to the first performance curve 404 corresponding to increased or full torque, the controller may communicate with the fuel governor sensor and control 152 to increase or maximize the quantity of fuel injected into the engine. When operating according to the second performance curve 406 corresponding to modified or reduced torque output, the controller may limit or restrict the amount of fuel the fuel governor sensor and control 152 injects to the engine.

One result of the engine operating to produce a lesser or reduced quantity of torque, especially as compared to its theoretically full torque capability, is that the engine generates less heat. Accordingly, because the engine operates cooler, the cooling system need not reject or remove as much heat from the engine and its associated components. The manufacturer may therefore reduce the size of the cooling system fitted to the engine and/or restrict the throughput of the exhaust system associated with the engine.

INDUSTRIAL APPLICABILITY

Referring to FIGS. 1 and 4, the present disclosure is applicable to accommodating or retrofitting an "over-the-road" or "on-highway" vehicle with additional emissions control devices such as a diesel particulate filter 130 or catalytic convertor 132, especially of the type included in the exhaust system 104. In addition or alternatively, the engine may be configured to run an exhaust gas re-circulation process by which exhaust gases are re-circulated to the engine intake. An original vehicle manufacturer or subsequent retrofitter installs, in a preliminary fitting step 450 of the method described in FIG. 4, the emissions control devices to the exhaust system 104 that would otherwise impede or restrict the heat rejection via the exhaust gases. The manufacturer or retrofitter may alternatively or additionally fit the vehicle with an exhaust gas recirculation system that may increase the engine operating temperature. The manufacturer or retrofitter also, in step 400, stores in the controller 150 the first performance curve 404 related to increased or full torque and the second performance curve 406 related to reduced or limited torque.

During operation, when the vehicle is operating in a low drive ratio 120, such as when the vehicle is hauling large loads or accelerating from idle to a higher speed, the controller 150 in the selection step 430 will determine that it is to select the first performance curve 404 from among the plurality of stored performance curves. The controller 150 will operate the engine 110 in accordance with the first performance curve 404 to provide an increased or even full quantity of torque and thus engine power. Under these conditions, including the increased torque output and restricted exhaust system 104, the cooling system 106 may have to operate at its rated capacity. The vehicle and controller may even have to sacrifice other performance criteria or employ remedial measures such as coolant temperature de-rates.

However, the vehicle will typically spend significant time in the high drive ratio 122, such as when traveling on highways or paved roads, conditions that typically require less torque and power. The controller 150 will accordingly select the second performance curve 406 corresponding to the reduced or limited torque and/or power output and operate the engine 110 accordingly. Because the engine 110 produces less torque and/or power and therefore generates less heat operating under the second performance curve 406, the cooling system 106 can adequately manage heat rejection or removal. Thus, installing the additional emissions control devices or techniques on the vehicle does not have as adverse an impact as may otherwise occur.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order and may eliminate any described step or operation unless otherwise indicated herein or otherwise clearly contradicted by context.

I claim:

1. A method of managing heat produced by an internal combustion system including an internal combustion engine coupled to a transmission, the method comprising:
    monitoring an engaged drive ratio of a transmission during operation of an internal combustion system, the transmission including at least a low drive ratio and a high drive ratio;
    storing in a controller a plurality of different performance curves including a first performance curve and a second performance curve, each performance curve selectable by the controller to operate the internal combustion engine;
    selecting a performance curve from the plurality of different performance curves based in part on the engaged drive ratio monitored from the transmission;
operating the internal combustion engine in accordance with the performance curve selected;
    cooling the internal combustion engine with a cooling system rated for engine operation under the second performance curve;
    wherein the first performance curve is selected when the transmission is engaged in the low drive ratio and the first performance curve increases torque output of the internal combustion engine; and
    the second performance curve is selected when the transmission is engaged in the high drive ratio and the second performance curve reduces torque output of the internal combustion engine.

2. The method of claim 1, wherein the first performance curve and the second performance curve determines an amount of fuel supplied to the internal combustion engine.

3. The method of claim 1, wherein the first performance curve and the second performance curve map torque compared to engine speed.

4. A system for managing heat produced by an internal combustion engine, the system comprising:
    an internal combustion engine;
    a transmission coupled to the internal combustion engine, the transmission including a plurality of different engageable drive ratios including at least a high drive ratio and a low drive ratio;
    a controller in communication with the transmission to monitor an engaged drive ratio, the controller storing a plurality of different performance curves including a first performance curve corresponding to comparatively increased torque output of the internal combustion engine in the low drive ratio and a second performance curve corresponding to comparatively reduced torque output of the internal combustion engine in the high drive ratio; and
    a cooling system rated for cooling the internal combustion engine during operation under the second performance curve;
    wherein during engine operation a performance curve selected by the controller is based in part upon the engaged drive ratio monitored in the transmission.

5. The system of claim 4, further comprising an exhaust system coupled to the internal combustion engine.

6. The system of claim 5, wherein the exhaust system includes at least one emissions control device restricting flow of exhaust gases.

7. The system of claim 6, wherein the emissions control device is selected from a group consisting of diesel particulate filters, catalytic convertors, and mufflers.

8. The system of claim 4, further comprising an exhaust gas re-circulation system re-circulating a portion of the exhaust gases back to the internal combustion engine.

9. The system of claim 4, wherein the first performance curve and the second performance curve map torque compared to engine speed.

10. The system of claim 4, further comprising a drive ratio control monitoring the engaged drive ratio of the transmission and communicating monitored information to the controller.

11. A method of enabling a vehicle to accommodate emissions controls comprising:
    providing a vehicle including an internal combustion engine coupled to a transmission, the transmission including at least a high drive ratio and a low drive ratio;
    installing on the vehicle at least one emissions control that adversely affects heat rejection from the internal combustion engine;
    storing in a controller on the vehicle a plurality of different performance curves, each performance curve selectable by the controller to operate the internal combustion engine; operating the internal combustion engine to propel the vehicle, wherein the plurality of different performance curves includes at least a first performance curve corresponding to the low drive ratio and a second performance curve corresponding to the high drive ratio;
    monitoring an engaged drive ratio of the transmission by the controller; and selecting a performance curve for the controller to operate the vehicle from the plurality of different performance curves based in part on the engaged drive ratio monitored by the controller;
    cooling the internal combustion engine with a cooling system rated for engine operation under the second performance curve;
    wherein the performance curve selected for the low drive ratio comparatively increases torque and the performance curve selected for the high drive ratio comparatively reduces torque.

12. The method of claim 11, wherein the emissions control is added to an exhaust system coupled to the internal combustion engine.

13. The method of claim 12, wherein the emissions control is selected from a group consisting of diesel particulate filters, catalytic convertors, and mufflers.

14. The method of claim 11, wherein the emissions control is an exhaust gas re-circulation system that re-circulates at least a portion of the exhaust gases back to the internal combustion engine.

15. The method of claim 11, wherein the controller monitors the engaged drive ratio of the transmission by a drive ratio control communicating with the controller and transmission.

16. The method of claim 11, wherein during operation under the second performance curve the controller reduces fuel injected to the internal combustion engine compared to during operation under the first performance curve.

* * * * *